(12) United States Patent
Ishida et al.

(10) Patent No.: US 8,481,210 B2
(45) Date of Patent: Jul. 9, 2013

(54) HYDROGEN-ABSORBING ALLOY, FABRICATION METHOD THEREOF AND ALKALINE STORAGE BATTERY

(75) Inventors: Jun Ishida, Takasaki (JP); Yoshifumi Magari, Kobe (JP); Shigekazu Yasuoka, Takasaki (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 239 days.

(21) Appl. No.: 12/944,952

(22) Filed: Nov. 12, 2010

(65) Prior Publication Data

US 2011/0151320 A1   Jun. 23, 2011

(30) Foreign Application Priority Data

Dec. 17, 2009  (JP) ................................. 2009-286699

(51) Int. Cl.
*H01M 4/58*    (2010.01)
*C22C 28/00*   (2006.01)

(52) U.S. Cl.
USPC ........................ 429/218.2; 429/209; 420/416

(58) Field of Classification Search
None
See application file for complete search history.

(56) References Cited

U.S. PATENT DOCUMENTS

| 6,130,006 A | 10/2000 | Kohno et al. |
| 6,214,492 B1 | 4/2001 | Kono et al. |
| 2006/0199076 A1* | 9/2006 | Yasuoka et al. ............ 429/218.2 |

FOREIGN PATENT DOCUMENTS

| JP | 11-323469 A | 11/1999 |
| JP | 2000-265229 A | 9/2000 |
| JP | 2002-164045 A | 6/2002 |
| JP | 2006-228536 A | 8/2006 |
| JP | 2007-254782 A | 10/2007 |

OTHER PUBLICATIONS

Chen et. al., Hydrogen Storage Alloys with PuNi-Type Structure as Metal Hydride Electrodes, Electrochemical and Solid-State Letters, 3(6) 249-252, 2000.*

* cited by examiner

*Primary Examiner* — Cynthia Walls
(74) *Attorney, Agent, or Firm* — Westerman, Hattori, Daniels & Adrian, LLP

(57) ABSTRACT

An alkaline storage battery has a negative electrode using a hydrogen-absorbing alloy represented by a general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$, and $2.8 \leq y+z \leq 4.0$ are satisfied. The hydrogen-absorbing alloy has a hexagonal system crystal structure or a rhombohedral system crystal structure as its main phase and has a subphase of line which average number of not less than 50 nm in thickness existing in the range of 10 μm×10 μm in the cross section of the main phase is 3 or less.

16 Claims, 7 Drawing Sheets

HYDROGEN-ABSORBING ALLOY, FABRICATION METHOD THEREOF AND ALKALINE STORAGE BATTERY

RELATED APPLICATIONS

The priority application number (s) JP-A2009-286699 upon which this application is based is hereby incorporated by reference.

BACKGROUND OF THE INVENTION

1. Field of the Invention

The present invention relates to a hydrogen-absorbing alloy, a fabrication method thereof, and an alkaline storage battery utilizing the hydrogen-absorbing alloy for its negative electrode. More particularly, a feature of the invention is an improvement in cycle life of an alkaline storage battery by enhancing its durability as well as maintaining a high hydrogen-absorbing capacity in a hydrogen-absorbing alloy used as its negative electrode.

2. Description of the Related Art

Conventionally, nickel-cadmium storage batteries have been commonly used as alkaline storage batteries. In recent years, nickel-metal hydride storage batteries using a hydrogen-absorbing alloy as a material for their negative electrodes have drawn considerable attention from the viewpoints that they have higher capacity than nickel-cadmium storage batteries and, being free of cadmium, they are more environmentally safe.

As the alkaline storage batteries of nickel-metal hydride storage batteries have been used in various portable devices, demands for further higher performance in the alkaline storage batteries have been increasing.

In the alkaline storage batteries, hydrogen-absorbing alloys such as a rare earth-nickel hydrogen-absorbing alloy having a $CaCu_5$ crystal structure as its main phase and a Laves phase hydrogen-absorbing alloy containing Ti, Zr, V and Ni having an $AB_2$ crystal structure as its main phase have been generally used for their negative electrodes.

However, these hydrogen-absorbing alloys generally do not necessarily have sufficient hydrogen-absorbing capability, and it has been difficult to increase the capacity of the alkaline storage batteries further.

In recent years, in order to improve the hydrogen-absorbing capability of the rare earth-nickel hydrogen-absorbing alloy, it has been proposed to use a hydrogen-absorbing alloy having a $Ce_2Ni_7$ type or the like crystal structure, rather than the $CaCu_5$ type, by adding Mg or the like to the rare earth-nickel hydrogen-absorbing alloy (See, for example, JP-A 11-323469).

Further, it has been proposed to use a hydrogen-absorbing alloy having a specific composition wherein Mg or the like is added to the rare earth-nickel hydrogen-absorbing alloy for the purpose of increasing flatness characteristics of a phase and also reducing a pressure difference between hydrogen-absorbing pressure and hydrogen-desorbing pressure (See, for example, JP-A 2000-265229).

Particularly, in a case where the hydrogen-absorbing alloy having a hexagonal system structure or a rhombohedral system structure as its main phase and having a mol ratio of Mg being not less than 15% against the total mol of rare earth and Mg is used as a negative electrode of alkaline storage battery, because of its high equilibrium pressure, an operating voltage of the alkaline storage battery is improved.

Nevertheless, a problem in using the above-described hydrogen-absorbing alloy has been that charging/discharging causes the hydrogen-absorbing alloy to split easily. Consequently, the hydrogen-absorbing alloy reacts with an alkaline electrolyte, and oxidization of the hydrogen-absorbing alloy and drying out of the alkaline electrolyte are caused, so that a cycle life of the alkaline storage battery is deteriorated.

SUMMARY OF THE INVENTION

It is an object of the present invention to improve a hydrogen-absorbing alloy used as a negative electrode in an alkaline storage battery which contains not less than 15% mol ratio of Mg against total of rare-earth element and Mg and forms a hexagonal system structure or a rhombohedral system structure as its main phase and thereby enhance durability of the hydrogen-absorbing alloy maintaining a high hydrogen-absorbing capability for the purpose of improving cycle life of alkaline storage battery.

In the present invention, a hydrogen-absorbing alloy is represented by a general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$ and $2.8 \leq y+z \leq 4.0$ are satisfied. Here, the hydrogen-absorbing alloy has a hexagonal system crystal structure or a rhombohedral system crystal structure as a main phase, and an average number of a subphase of line of not less than 50 nm in thickness in the range of 10 μm×10 μm of a cross section of the main phase is 3 or less.

In the foregoing hydrogen-absorbing alloy, as the hexagonal system crystal structure for its main phase, a $CeNi_3$ type crystal structure, a $Ce_2Ni_7$ type crystal structure, a $Pr_5Co_{19}$ type crystal structure and the like exist. Further, as the rhombohedral system crystal structure, $PuNi_3$ type crystal structure, $Gd_2Ni_7$ type crystal structure, $Ce_5Co_{19}$ type crystal structure and the like exist. Among these crystal structures, the hydrogen-absorbing alloy having the $Ce_2Ni_7$ type crystal structure is preferably used for the purpose of obtaining high hydrogen-absorbing capability.

The hydrogen-absorbing alloy containing Mg has an advantage that a battery voltage is enhanced in associated with improvement of an equilibrium pressure. However, if a ratio of Mg is excessive, it becomes difficult to maintain the hexagonal system crystal structure or the rhombohedral system crystal structure in its main phase, so that sufficient characteristics can not be obtained. Therefore, in the present invention, the hydrogen-absorbing alloy wherein the value x representing the mol ratio of Mg satisfies $0.15 \leq x \leq 0.30$ represented by the above formula is used.

Further, in the present invention, the total (y+x) of the above formula wherein y is mol ratio of Ni and z is mol ratio of element A contained in the hydrogen-absorbing alloy satisfies $2.8 \leq y+z \leq 4.0$ for the following reasons. If the value of y+z is less than 2.8, it is impossible to maintain the hexagonal system crystal structure or the rhombohedral system crystal structure in the main phase, so that sufficient characteristics can not be obtained. On the other hand, if the value of y+z is over 4.0, phases forming $CaCu_5$ type crystal structure are generated too much, so that the amount of hydrogen to be absorbed is reduced. Further, in order to enhance effects of improving the battery voltage by adding Mg, it is preferable that the value of y+z of the hydrogen-absorbing alloy to be used be not less than 3.4, and more preferably be not less than 3.45.

In the hydrogen-absorbing alloy according to the present invention, the crystal system structure of subphase is different from a hexagonal system crystal structure or a rhombohedral system crystal structure of the main phase. Normally, the subphase has an $AB_2$ type face-centered cubic crystal structure wherein the Mg ratio is larger than that of main phase, and the mol ratio of rare-earth element, Mg, and Ni+element A is almost 1:1:4.

Here, in accordance with cooling from the high temperature being close to melting point of the main phase, the crystal structure of subphase is granularly grown in an inside and a boundary of the main phase generally toward the phase which is vertical to c axis of the main phase. Further, the reason of grain growth of the subphase is thought to be that because a solid melting limit amount of Mg in the main phase is reduced, excess Mg becomes the subphase and a phase separation occurs. Then, as the foregoing subphase is gradually grown, it is thought to be that the subphase grows to a tabular shape, cutting the main phase into pieces small toward the phase which is vertical to c axis of the main phase.

Therefore, a fabrication method of a first hydrogen-absorbing alloy comprises steps of: heat-treating a hydrogen-absorbing alloy represented by the general formula $Ln_{1-x}Mg_x$-$Ni_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$, and $2.8 \leq y+z \leq 4.0$ are satisfied at a temperature 10° C. to 110° C. lower than its melting point for one hour or more; and rapid-cooling the hydrogen-absorbing alloy after the heat-treatment at a cooling speed of not less than 0.5° C./sec from the heat-treatment temperature.

Further, a fabrication method of a second hydrogen-absorbing alloy comprises steps of: heat-treating a hydrogen-absorbing alloy represented by the general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$, and $2.8 \leq y+z \leq 4.0$ are satisfied, at a temperature 10° C. to 60° C. lower than its melting point for one hour or more;

cooling the hydrogen-absorbing alloy after the heat-treatment;

heat-treating the hydrogen-absorbing alloy at the temperature 10° C. to 110° C. lower than its melting point for one hour or more; and rapid-cooling the hydrogen-absorbing alloy after the heat-treatment at a cooling speed of not less than 0.5° C./sec from the heat-treatment temperature.

Consequently, the hydrogen-absorbing alloy after heat-treatment at the temperature 10° C. to 110° C. lower than its melting point for one hour or more as described above is homogenized, and hydrogen absorbing/desorbing capability is stabilized.

Further, the hydrogen-absorbing alloy is more homogenized by being heat-treated at the temperature 10° C. to 60° C. lower than its melting point and further being heat-treated at the temperature 10° C. to 110° C. lower than its melting point as the fabrication method of the second hydrogen-absorbing alloy as described above.

In the fabrication method of the second hydrogen-absorbing alloy, it is preferable that the heat-treating temperature in the heat-treatment of the hydrogen-absorbing alloy at 10° C. to 110° C. lower than its melting point for one hour or more is lower than the heat-treating temperature in the heat-treatment at 10° C. to 60° C. lower than its melting point. As a result, generation of the subphase other than $AB_2$ type face-centered cubic structure one which is easily generated by rapid-cooling is suppressed. Further, hydrogen absorbing/desorbing capability is stabilized.

Further, in the fabrication methods of the first and the second hydrogen-absorbing alloys, the hydrogen-absorbing alloy is heat-treated at the temperature close to its melting point and rapid-cooled from the heat-treating temperature at a cooling speed of not less than 0.5° C./sec. As a result, the subphase is prevented from growing to the tabular shape cutting the main phase into pieces toward the phase which is vertical to c axis of the main phase, so that a subphase of granular shape is formed in distributed condition.

In order to further prevent the subphase from growing to the tabular shape cutting the main phase into pieces toward the phase which is vertical to c axis of the main phase, in rapid-cooling of the hydrogen-absorbing alloy from the heat-treating temperature, it is preferable that the cooling speed be not less than 100° C./sec.

Further, the hydrogen-absorbing alloy after heat-treatment may be soaked in a coolant or be under an atmosphere of which major component is He in the case of rapid-cooling of the hydrogen-absorbing alloy after heat-treatment from the heat-treating temperature.

In this invention, an alkaline storage battery comprising a positive electrode, a negative electrode using a hydrogen-absorbing alloy and an alkaline electrolyte utilizes the foregoing hydrogen-absorbing alloy as the negative electrode.

Further, in this invention, the negative electrode of the alkaline storage battery utilizes, as described above, the hydrogen-absorbing alloy represented by the general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$, and $2.8 \leq y+z \leq 4.0$ are satisfied, having the hexagonal system crystal structure or the rhombohedral system crystal structure; therefore, the hydrogen-absorbing alloy has high hydrogen-absorbing capability, making it possible to attain a high-capacity alkaline storage battery.

According to this invention, in the cross section of the hydrogen-absorbing alloy, the average number of the subphase of line of not less than 50 nm in thickness existing in the range of 10 μm×10 μm is 3 or less. Therefore, even in the case of charging and discharging of the alkaline storage battery, generation of crack between the main phase and the subphase due to difference of volume change therebetween resulting from absorbing/desorbing of the hydrogen is restricted.

As a result, in the alkaline storage battery according to this invention, the hydrogen-absorbing alloy is prevented from splitting by charging and discharging, and therefore, a reaction between the hydrogen-absorbing alloy and the alkaline electrolyte is restricted. Consequently, the degradation of characteristics of the hydrogen-absorbing alloy caused by oxidation thereof is suppressed and dry out of the alkaline electrolyte is prohibited, so that an alkaline storage battery of high-capacity having an excellent cycle life can be attained.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
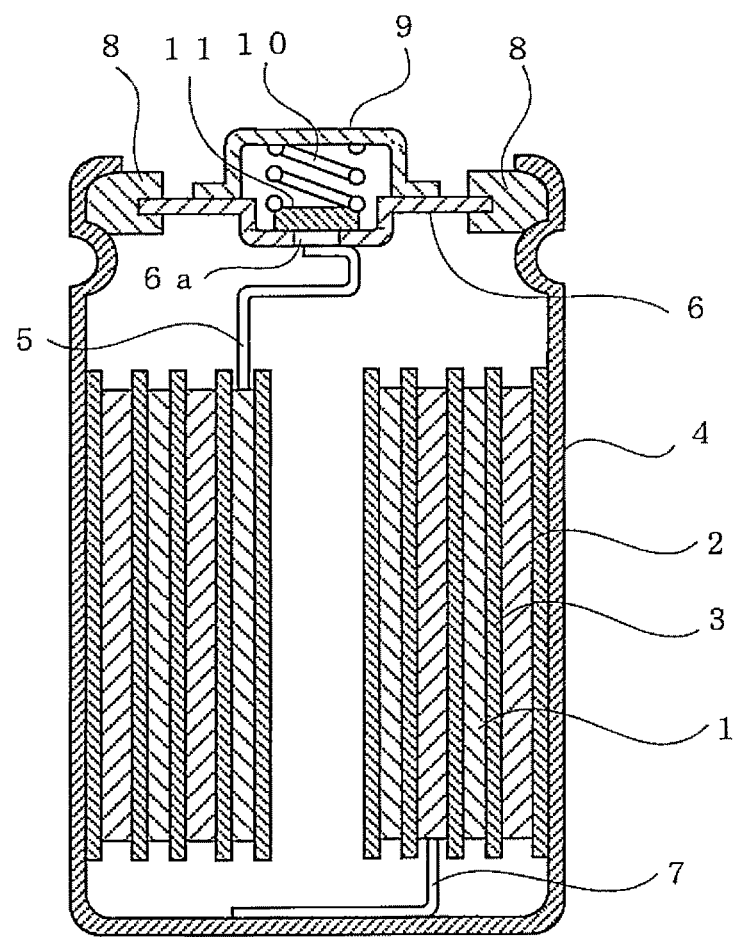
FIG. 1 is a schematic cross-sectional view illustrating an alkaline storage battery fabricated in Examples and Comparative Examples of the invention.

Hereinbelow, hydrogen-absorbing alloys, fabrication methods thereof and alkaline storage batteries utilizing the hydrogen-absorbing alloys as their negative electrodes according to embodiments of the invention are specifically described, and it will be demonstrated by the comparison with comparative examples that the cycle life is improved in the alkaline storage batteries. It should be construed, however, that the hydrogen-absorbing alloys, the fabrication methods thereof and the alkaline storage batteries utilizing the hydrogen-absorbing alloys as their negative electrodes according to the invention are not limited to those illustrated in the following embodiments, and various changes and modifications may be made unless such changes and modifications depart from the scope of the invention.

EXAMPLE 1

An alkaline storage battery of Example 1 utilized a hydrogen-absorbing alloy fabricated in the following manner as a negative electrode active material of a negative electrode. Mg, Ni and Al as well as rare-earth elements La, Ce and Nd were mixed together to produce a predetermined alloy composition, and the mixture was then melted by a high frequency induction melting furnace in an argon atmosphere and then poured into a mold. After that, the resultant mixture was cooled to a room temperature to prepare a hydrogen-absorbing alloy ingot. The composition of the hydrogen-absorbing alloy thus prepared was analyzed by an inductively-coupled plasma optical emission spectroscopy (ICP). As a result, the composition of the hydrogen-absorbing alloy was found to be $(La_{0.3}Ce_{0.4}Nd_{0.3})_{0.85}Mg_{0.15}Ni_{3.3}Al_{0.2}$. Further, the melting point of the hydrogen-absorbing alloy was determined by a differential scanning calorimeter (DSC). As a result, the melting point thereof was 1015° C.

Then, the hydrogen-absorbing alloy ingot was homogenized by heat-treating at 965° C. which was 50° C. lower than its melting point in the furnace of argon atmosphere for 10 hours. After that, the hydrogen-absorbing alloy ingot was gradually cooled to a room temperature in the furnace at a cooling speed of 5° C./min (about 0.08° C./sec).

Next, as a second heat-treatment, the hydrogen-absorbing alloy ingot thus cooled was heat-treated at 930° C. which was 85° C. lower than its melting point in the furnace of argon atmosphere for 10 hours. Then, the hydrogen-absorbing alloy ingot was rapid-cooled by directly soaking in water being at the room temperature. Thus, in the case where the hydrogen-absorbing alloy ingot after heat-treatment was soaked in the water at the room temperature, boiling in the surface of the hydrogen-absorbing alloy ingot was stopped within 5 minutes after the soaking, and the hydrogen-absorbing alloy ingot was cooled to 100° C. or less. A cooling speed was 160° C./sec.

Subsequently, oxides on the surface of the hydrogen-absorbing alloy ingot after rapid-cooling were removed. Next, the resultant hydrogen-absorbing alloy ingot was mechanically pulverized in an inert atmosphere and classified to obtain a hydrogen-absorbing alloy powder of Example 1. The hydrogen-absorbing alloy powder of Example 1 had the composition of $(La_{0.3}Ce_{0.4}Nd_{0.3})_{0.85}Mg_{0.15}Ni_{3.3}Al_{0.2}$. The particle size distribution of the resultant hydrogen-absorbing alloy powder was measured with a laser diffraction/scattering particle size analyzer, and an average particle size at 50% of weight integral was found to be 65 μm.

Then, 0.5 parts by mass of polyvinyl pyrrolidone, 0.5 parts by mass of polyethylene oxide, and 20 parts by mass of water were mixed with 100 parts of the hydrogen-absorbing alloy powder to prepare negative electrode mixture slurry. The prepared negative electrode mixture slurry was applied uniformly onto both sides of conductive core made of a punched metal and then was dried. The resultant material was pressed and thereafter cut into predetermined dimensions. Thus, a negative electrode for an alkaline storage battery of Example 1 was prepared.

Meanwhile, a nickel-hydroxide particle of which surface was covered with high-grade cobalt oxide was used as a positive electrode active material to prepare a positive electrode. Here, the high-grade cobalt oxide had a valence of cobalt exceeding 3.

Then, 3 parts by mass of zinc oxide was mixed with 97 parts by mass of the foregoing positive electrode active material. Further, the resultant mixture was mixed with 50 parts by mass of a solution of 0.2 mass % hydroxy propyl cellulose to prepare positive electrode mixture slurry. Then, the resultant positive electrode mixture slurry was filled into a nickel foam having a weight per unit area of 600 g/m$^2$, a porosity of 95% and a thickness of about 2 mm. The resultant was dried and pressed so that a positive electrode active material density was about 2.9 g/m$^3$-void, and thereafter was cut into predetermined dimensions. Thus, a positive electrode of non-sintered nickel electrode for an alkaline storage battery of Example 1 was prepared.

A nonwoven fabric made of polypropylene was used as a separator. An alkaline electrolyte solution used was an alkaline aqueous solution containing KOH, NaOH, and LiOH at a mass ratio of 15:2:1 and having a specific gravity of 1.30 at 25° C. Using these components, an alkaline storage battery was prepared, which had a design capacity of 1500 mAh and a cylindrical shape as illustrated in FIG. 1.

The alkaline storage battery was fabricated in the following manner. A positive electrode 1 and a negative electrode 2 were spirally coiled with a separator 3 interposed therebetween, as illustrated in FIG. 1, and these were accommodated in a battery can 4. The positive electrode 1 was connected to a positive electrode cap 6 via a positive electrode lead 5, and the negative electrode 2 was connected to the battery can 4 via a negative electrode lead 7. Then, 2.2 g of the alkaline electrolyte solution was poured into the battery can 4. Thereafter, an insulative packing 8 was placed between the battery can 4 and a positive electrode cap 6, and the battery can 4 was sealed. The battery can 4 and the positive electrode cap 6 were electrically insulated by the insulative packing 8. A blockade 11 attaching a coil spring 10 was placed between the positive electrode cap 6 and a positive electrode external terminal 9 so as to blockade a gas-releasing hole 6a provided on the positive electrode cap 6. The coil spring 10 can be compressed to release gas from the interior of the battery to the atmosphere when the internal pressure of the battery unusually increases.

COMPARATIVE EXAMPLE 1

In Comparative Example 1, in fabrication of the hydrogen-absorbing alloy of Example 1, the hydrogen-absorbing alloy ingot was homogenized by heat-treating at 965° C. which was 50° C. lower than its melting point in the furnace of argon atmosphere for 10 hours. After that, the hydrogen-absorbing alloy ingot was gradually cooled to the room temperature in the furnace at the cooling speed of 5° C./min (about 0.08° C./sec). The second heat-treatment was not conducted in Comparative Example 1.

An alkaline storage battery of Comparative Example 1 was fabricated in the same manner as in Example 1 except that the hydrogen-absorbing alloy ingot obtained as above was used to prepare a hydrogen-absorbing alloy powder.

Figure 2:
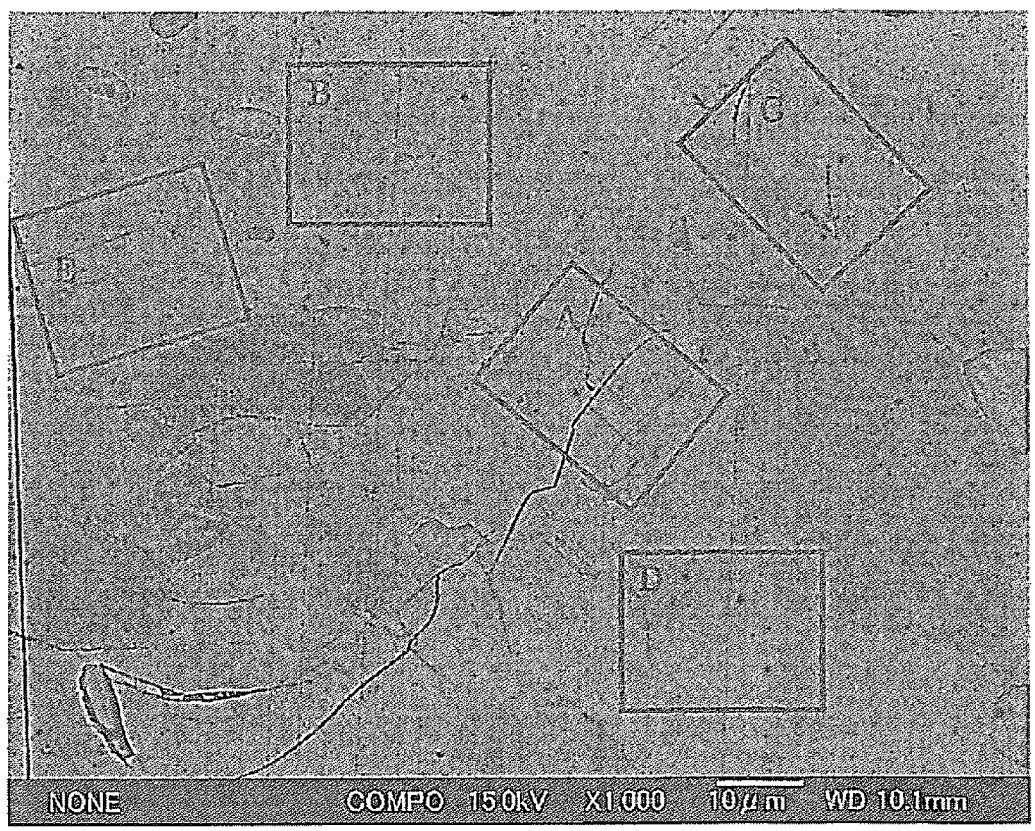
FIG. 2 is an illustration showing a condition of cross section of a hydrogen-absorbing alloy fabricated in Example 1 observed by means of SEM.
Figure 3:
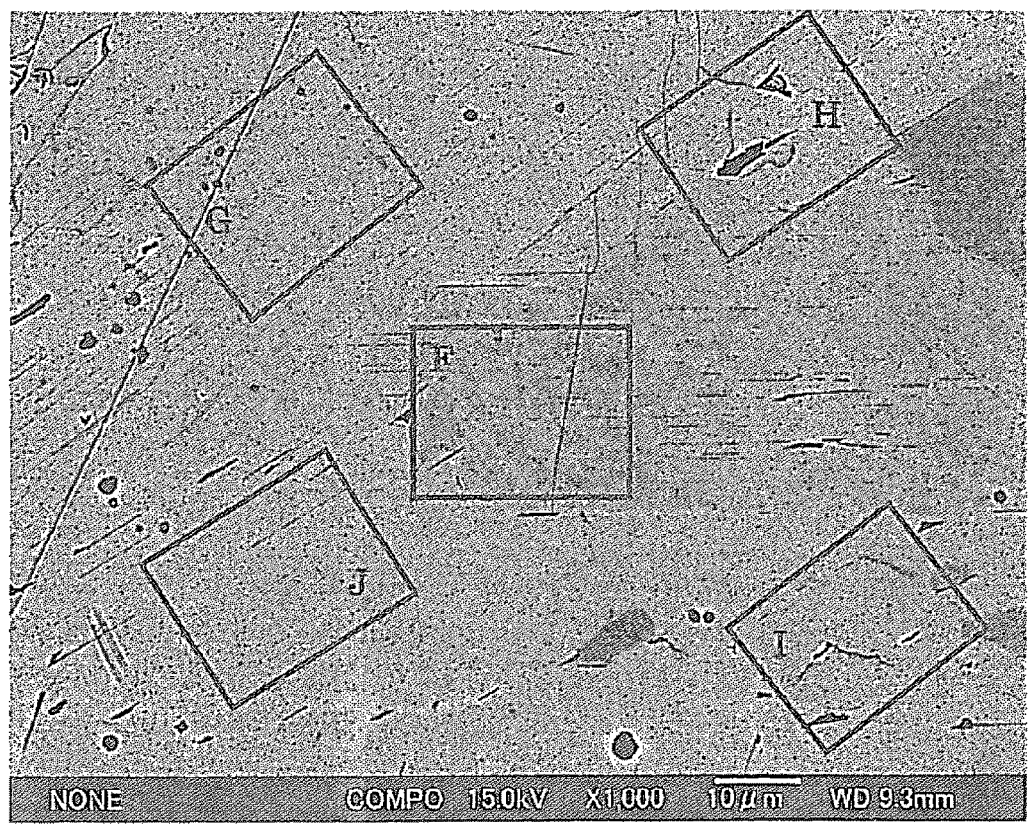
FIG. 3 is an illustration showing a condition of cross section of a hydrogen-absorbing alloy fabricated in Comparative Example 1 observed by means of SEM.

Here, a cross section of the hydrogen-absorbing alloy ingot fabricated in Example 1 was observed by means of SEM, and the result was shown in FIG. 2. Also, a cross section of the hydrogen-absorbing alloy ingot fabricated in Comparative Example 1 was observed by means of SEM, and the result was shown in FIG. 3.

Figure 4:
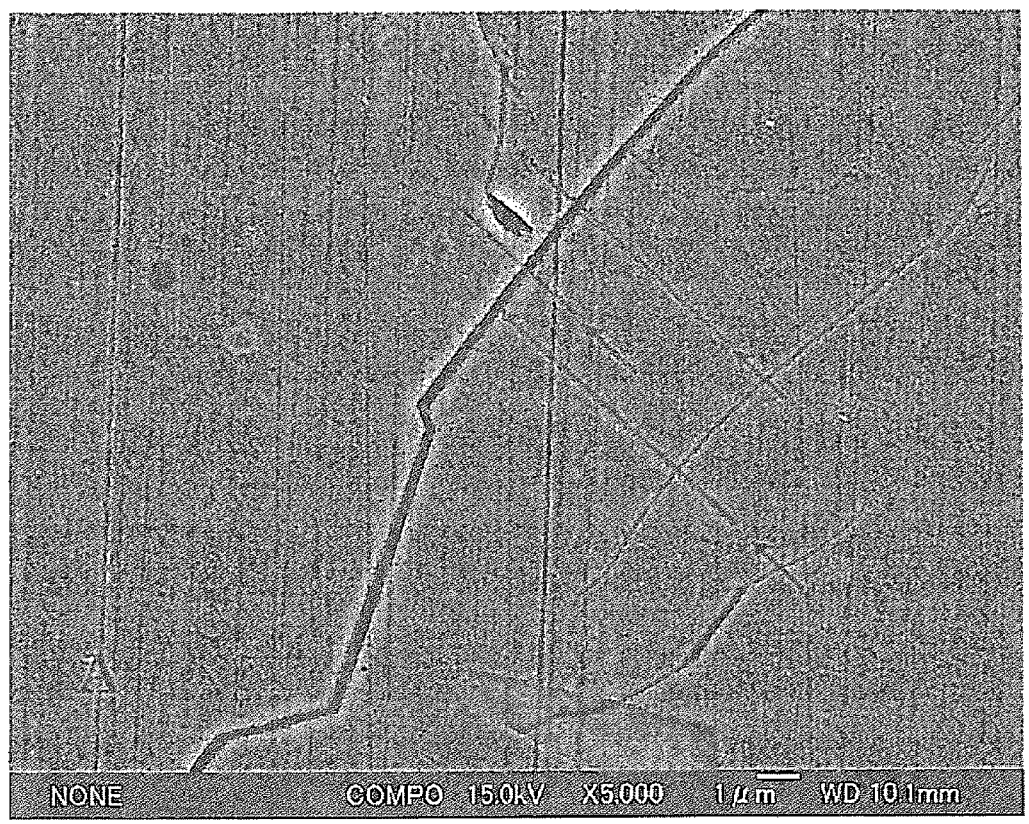
FIG. 4 is an enlargement of area A shown in FIG. 2.
Figure 5:
FIG. 5 is an enlargement of area F shown in FIG. 3.

In Example 1, the number of a subphase of line having a thickness of not less than 50 nm in five areas of A to E having a size of 16 μm×20 μm shown in FIG. 2 was measured. Also, in Comparative Example 1, the number of a subphase of line having a thickness of not less than 50 nm in five areas of F to J having a size of 16 μm×20 μm shown in FIG. 3 was measured. Here, each of the measured numbers was converted to the number of the subphase existing in the range of 10 μm×10 μm. Then, using the converted numbers, each average number of the subphase existing in the range of 10 μm×10 μm was determined. The results were shown in Table 1 below. Here, FIG. 4 shows an enlargement of area A shown in FIG. 2 and FIG. 5 shows an enlargement of area F shown in FIG. 3 for references. Further, in FIG. 4 and FIG. 5, the subphases of line having a thickness of not less than 50 nm are indicated by arrows.

TABLE 1

| | Measured area | Number of subphase of line | Number of line subphase converted to be in the range of 10 μm × 10 μm | Average number of line subphase in the range of 10 μm × 10 μm |
|---|---|---|---|---|
| Example 1 | A | 3 | 1.9 | 0.6 |
| | B | 0 | 0 | |
| | C | 1 | 0.6 | |
| | D | 0 | 0 | |
| | E | 1 | 0.6 | |
| Comparative Example 1 | F | 14 | 8.8 | 6.1 |
| | G | 10 | 6.3 | |
| | H | 10 | 6.3 | |
| | I | 6 | 3.8 | |
| | J | 9 | 5.6 | |

According to the results, the hydrogen-absorbing alloy of Example 1 wherein the hydrogen-absorbing alloy ingot after second heat-treatment was rapid-cooled by directly soaking in the water of room temperature exhibits a small number, 0.6 as the average number of subphase of line existing in the range of 10 μm×10 μm of the cross section. On the other hand, the hydrogen-absorbing alloy of Comparative Example 1 wherein the hydrogen-absorbing alloy ingot after the first heat-treatment was only gradually cooled exhibits a large number, 6.1 as the average number of subphase of line existing in the range of 10 μm×10 μm of the cross section.

Each of the hydrogen-absorbing alloys fabricated in Example 1 and Comparative Example 1 was subjected to X-ray diffraction analysis using TTR-II (a tradename for an X-ray diffraction analyzer employing a Cu-Kα radiation as an X-ray source made by Rigaku Corp.). Also, as to main phase parts and subphase parts, each hydrogen-absorbing alloy was measured by an energy dispersive X-ray spectroscopy. According to the results of the measurement of the hydrogen-absorbing alloys of Example 1 and Comparative Example 1, it is found that the main phase parts had a hexagonal crystal system while the subphase parts had an $AB_2$ type face-centered cubic crystal structure.

Next, the alkaline storage batteries of Example 1 and Comparative Example 1 fabricated as above were charged at a current of 150 mA for 16 hours at a temperature of 25° C. and then discharged at a current of 1500 mA until the battery voltage became 1.0V. This charging and discharging process was defined as one cycle. Then, 3 cycles charging and discharging were conducted to activate the alkaline storage batteries of Example 1 and Comparative Example 1.

Then, each of the alkaline storage batteries of Example 1 and Comparative Example 1 that was activated in the above-described manner was charged at the current of 1500 mA at the temperature of 25° C. After the battery voltage reached the maximum value, each battery was further charged until the voltage lowered 10 mV, and then, 30 minutes pause was made. Next, each battery was discharged at the current of 1500 mA until the voltage reached 1.0 V, and thereafter 30 minutes pause was made. This charging and discharging process was defined as one cycle and 20 cycles charging and discharging were conducted.

Next, the hydrogen-absorbing alloy was taken from the negative electrode of each of alkaline storage batteries after 20 cycles charging and discharging and rinsed to remove the alkaline electrolyte. After that, the hydrogen-absorbing alloy was dried at a decompressed condition in order to obtain a hydrogen-absorbing alloy powder after 20 cycles.

As to each hydrogen-absorbing alloy powder of Example 1 and Comparative Example 1 before activation and each hydrogen-absorbing alloy powder of Example 1 and Comparative Example 1 after 20 cycles, each specific surface area was measured by nitrogen gas absorption method. Then, an increment of specific surface area of the hydrogen-absorbing alloy powder after 20 cycles against that of the hydrogen-absorbing alloy powder before activation was calculated. Next, the increment in specific surface area of hydrogen-absorbing alloy powder of Example 1 was determined using an index wherein the increment in specific surface area of hydrogen-absorbing alloy powder of Comparative Example 1 was taken as 100. The results are shown in Table 2 below.

TABLE 2

| | Average number of line subphase in the range of 10 μm × 10 μm | Increment in specific surface area of hydrogen-absorbing alloy after 20 cycles |
|---|---|---|
| Example 1 | 0.6 | 92 |
| Comparative Example 1 | 6.1 | 100 |

According to the results, the hydrogen-absorbing alloy of Example 1 exhibits smaller increment in the specific surface area of the hydrogen-absorbing alloy powder after 20 cycles as compared with Comparative Example 1. This reason is thought to be as follows. Because the hydrogen-absorbing alloy in alkaline storage battery of Example 1 had a smaller average number of the subphase of line in its cross section as compared with Comparative Example 1, split of the hydrogen-absorbing alloy during charging and discharging was restricted.

EXAMPLE 2

An alkaline storage battery of Example 2 utilized a hydrogen-absorbing alloy fabricated in the following manner as a negative electrode active material of a negative electrode. Mg, Ni and Al as well as rare-earth elements La and Sm were mixed together to produce a predetermined alloy composition, and the mixture was then melted by a high frequency induction melting furnace in an argon atmosphere and then poured into a mold. After that, the resultant mixture was cooled to a room temperature to prepare a hydrogen-absorbing alloy ingot. The composition of the hydrogen-absorbing alloy thus prepared was analyzed by an inductively-coupled plasma optical emission spectroscopy (ICP). As a result, the composition of the hydrogen-absorbing alloy was found to be $La_{0.65}Sm_{0.15}Mg_{0.20}Ni_{3.40}Al_{0.20}$. Further, the melting point of the hydrogen-absorbing alloy was determined by a differential scanning calorimeter (DSC). As a result, the melting point thereof was 980° C.

Then, the hydrogen-absorbing alloy ingot was homogenized by heat-treating at 930° C. which was 50° C. lower than its melting point in the furnace of argon atmosphere for 10 hours. After that, the hydrogen-absorbing alloy ingot was cooled by spraying a great deal of He gas. The temperature of the hydrogen-absorbing alloy ingot was lowered from 930° C. to 480° C. in 10 minutes. The cooling speed was 0.75° C./sec and the time necessitated for cooling to 600° C. was about 8 minutes.

Except that the foregoing hydrogen-absorbing alloy ingot was used to produce a hydrogen-absorbing alloy powder for a negative electrode active material, the alkaline storage battery of Example 2 was fabricated in the same manner as in Example 1.

COMPARATIVE EXAMPLE 2

In an alkaline storage battery of Comparative Example 2, in fabrication of the hydrogen-absorbing alloy of Example 2, the hydrogen-absorbing alloy ingot was homogenized by heat-treating at 930° C. which was 50° C. lower than its melting point in the furnace of argon atmosphere for 10 hours. After that, without spraying He gas, the hydrogen-absorbing alloy ingot was gradually cooled in the furnace at the cooling speed of 5° C./min (about 0.08° C./sec). The temperature of the hydrogen-absorbing alloy ingot was lowered to 880° C. in 10 minutes. The time necessitated for cooling to 600° C. was about 70 minutes.

Except that the foregoing hydrogen-absorbing alloy ingot was used to produce a hydrogen-absorbing alloy powder for a negative electrode active material, the alkaline storage battery of Comparative Example 2 was fabricated in the same manner as in Example 2.

Figure 6:
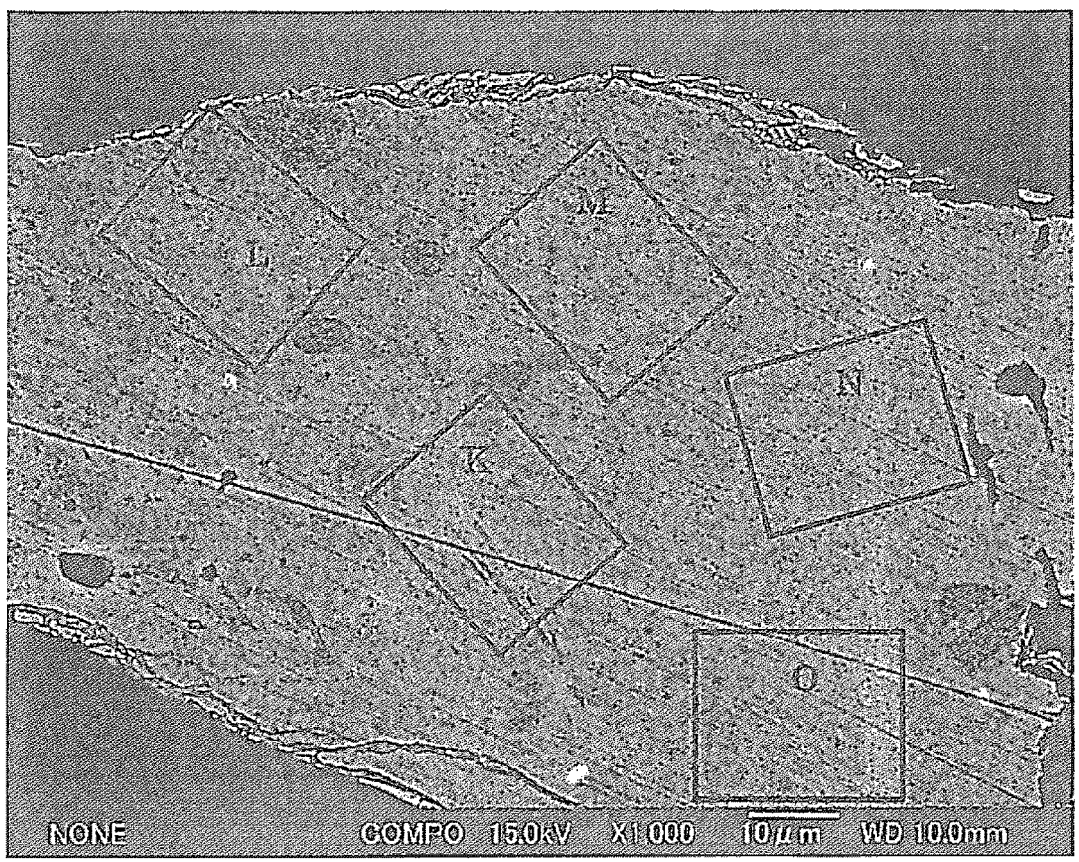
FIG. 6 is an illustration showing a condition of cross section of a hydrogen-absorbing alloy fabricated in Example 2 observed by means of SEM.
Figure 7:
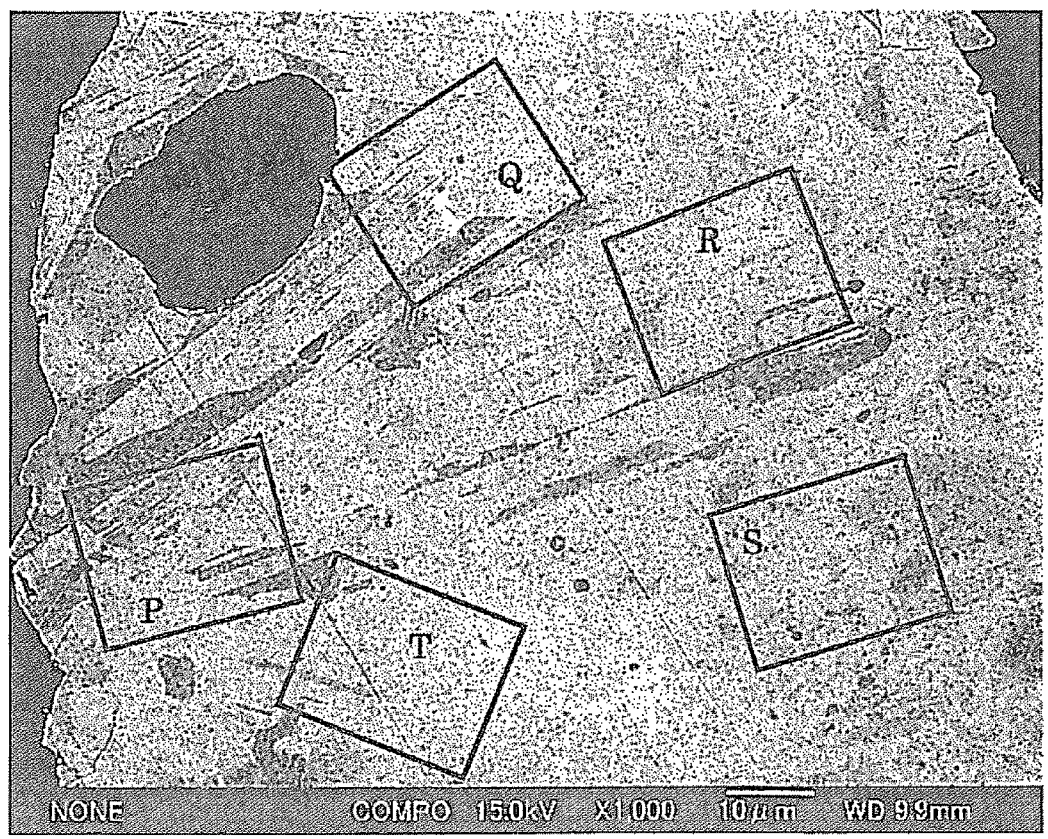
FIG. 7 is an illustration showing a condition of cross section of a hydrogen-absorbing alloy fabricated in Comparative Example 2 observed by means of SEM.

Here, a cross section of the hydrogen-absorbing alloy ingot fabricated in Example 2 was observed by means of SEM, and the result was shown in FIG. 6. Also, a cross section of the hydrogen-absorbing alloy ingot fabricated in Comparative Example 2 was observed by means of SEM, and the result was shown in FIG. 7.

In Example 2, the number of a subphase of line having a thickness of not less than 50 nm in five areas of K to O having a size of 16 μm×20 μm shown in FIG. 6 was measured. Also, in Comparative Example 2, the number of a subphase of line having a thickness of not less than 50 nm in five areas of P to T having a size of 16 μm×20 μm shown in FIG. 7 was measured. Here, each of the measured numbers was converted to the number of the subphase existing in the range of 10 μm×10 μm. Then, using the converted numbers, each average number of the subphase existing in the range of 10 μm×10 μm was determined. The results were shown in Table 3 below.

TABLE 3

| | Measured area | Number of subphase of line | Number of line subphase converted to be in the range of 10 μm × 10 μm | Average number of line subphase in the range of 10 μm × 10 μm |
|---|---|---|---|---|
| Example 2 | K | 4 | 2.5 | 1.5 |
| | L | 4 | 2.5 | |
| | M | 2 | 1.3 | |
| | N | 2 | 1.3 | |
| | O | 0 | 0 | |
| Comparative Example 2 | P | 17 | 10.6 | 6.4 |
| | Q | 14 | 8.8 | |
| | R | 6 | 3.8 | |
| | S | 9 | 5.6 | |
| | T | 5 | 3.1 | |

According to the results, the hydrogen-absorbing alloy of Example 2 wherein the hydrogen-absorbing alloy ingot after heat-treatment was rapid-cooled at the cooling speed of 0.5° C./sec or more by spraying a great deal of He gas exhibits a small number, 1.5 as the average number of subphase of line existing in the range of 10 μm×10 μm of the cross section. On the other hand, the hydrogen-absorbing alloy of Comparative Example 2 wherein the hydrogen-absorbing alloy ingot after heat-treatment was only gradually cooled exhibits a large number, 6.4 as the average number of subphase of line existing in the range of 10 μm×10 μm of the cross section.

Each of the hydrogen-absorbing alloys fabricated in Example 2 and Comparative Example 2 was measured in the same manner as Example 1 and Comparative Example 1. According to the results of the measurement of the hydrogen-absorbing alloys of Example 2 and Comparative Example 2, the main phase parts had the hexagonal crystal system while the subphase parts had the $AB_2$ type face-centered cubic crystal structure.

Next, the alkaline storage batteries of Example 2 and Comparative Example 2 fabricated as above were charged at a current of 150 mA for 16 hours at a temperature of 25° C. and then discharged at a current of 1500 mA until the battery voltage became 1.0V. This charging and discharging process was defined as one cycle. Then, 3 cycles charging and discharging were repeated to activate the alkaline storage batteries of Example 2 and Comparative Example 2.

Then, each of the alkaline storage batteries of Example 2 and Comparative Example 2 that was activated in the above-described manner was charged at a current of 1500 mA at the temperature of 25° C. After the battery voltage reached the maximum value, each battery was further charged until the voltage lowered 10 mV, and then, 30 minutes pause was made. Next, each battery was discharged at a current of 1500 mA until the voltage reached 1.0 V, and thereafter 30 minutes pause was made. This charging and discharging process was defined as one cycle and 50 cycles were repeated. Next, the hydrogen-absorbing alloy was taken from the negative electrode of each of alkaline storage batteries and rinsed to remove the alkaline electrolyte. After that, the hydrogen-absorbing alloy was dried at the decompressed condition in order to obtain a hydrogen-absorbing alloy powder after 50 cycles.

As to each hydrogen-absorbing alloy powder, oxygen concentration (mass %) was measured under inert gas atmosphere by melt-extracting method using an apparatus for analyzing oxygen (made by LECO corporation). Next, the oxygen concentration of hydrogen-absorbing alloy powder of Comparative Example 2 was defined as 100 and each oxygen concentration of hydrogen-absorbing alloy powder was determined. The results are shown in Table 4 below.

As to each of the alkaline storage batteries of Example 2 and Comparative Example 2 that was activated, charging and discharging was repeated in the above-described manner. Then, the number of cycle wherein a discharge capacity reached 1000 mAh was determined. Then, a battery life of alkaline storage battery of Example 2 was calculated using an index wherein the number of cycle of alkaline storage battery of Comparative Example 2 determined was taken as battery life 100. The results are shown in Table 4 below.

TABLE 4

| | Average number of line subphase in the range of 10 μm × 10 μm | Oxygen concentration after 50 cycles | Battery life |
|---|---|---|---|
| Example 2 | 1.5 | 95 | 106 |
| Comparative Example 2 | 6.4 | 100 | 100 |

According to the results, the oxygen concentration of hydrogen-absorbing alloy powder after 50 cycles in alkaline storage battery of Example 2 wherein the hydrogen-absorbing alloy had the small number of line subphase in its cross section was lower as compared with the alkaline storage battery of Comparative Example 2 wherein the hydrogen-absorbing alloy had the large number of line subphase in its cross section. The reason thereof is thought to be as follows. In the alkaline storage battery of Example 2 wherein the hydrogen-absorbing alloy having the small number of subphase was used, split of the hydrogen-absorbing alloy due to charging and discharging was restricted and the increment of surface specific area was inhibited, so that oxidization of the hydrogen-absorbing alloy resulting from the reaction between the alkaline electrolyte and itself was suppressed.

Further, in the alkaline storage battery of Example 2, oxidization of the hydrogen-absorbing alloy resulting from the reaction between the hydrogen-absorbing alloy and the alkaline electrolyte was restricted as mentioned above, and dry out of the alkaline storage battery was suppressed, and that is thought to be the reason why the battery life of the alkaline storage battery of Example 2 was more improved as compared with the alkaline storage battery of Comparative Example 2.

Although the present invention has been fully described byway of examples, it is to be noted that various changes and modifications will be apparent to those skilled in the art.

Therefore, unless otherwise such changes and modifications depart from the scope of the present invention, they should be construed as being included therein.

The invention claimed is:

1. A hydrogen-absorbing alloy represented by a general formula

wherein:
Ln is at least one element selected from rare-earth elements including Y, Ca, Zr, and Ti;
A is at least one element selected from Co, Fe, Mn, V, Cr, Nb, Al, Ga, Zn, Sn, Cu, Si, P and B; and
$0.15 \leq x \leq 0.30$, $0 < z \leq 1.5$ and $2.8 \leq y+z \leq 4.0$ are satisfied, wherein
a main phase has a hexagonal system crystal structure or a rhombohedral system crystal structure, and
a subphase in the range of 10 μm×10 μm of a cross section of the main phase has an average number of a line of not less than 50 μm in thickness of 3 or less.

2. The hydrogen-absorbing alloy as claimed in claim 1, wherein
the subphase has a different crystal structure from the hexagonal system crystal structure or the rhombohedral system crystal structure.

3. A fabrication method of a hydrogen-absorbing alloy represented by a general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$ and $2.8 \leq y+z \leq 4.0$ are satisfied, comprising the steps of:
heat-treating the hydrogen-absorbing alloy at a temperature 10° C. to 110° C. lower than a melting point of hydrogen-absorbing alloy for one hour or more; and
rapid-cooling the hydrogen-absorbing alloy after the heat-treatment at a cooling speed of not less than 0.5° C./sec from a heat-treatment temperature.

4. The fabrication method of hydrogen-absorbing alloy as claimed in claim 3, wherein the hydrogen-absorbing alloy after heat-treatment is rapid-cooled from the heat-treatment temperature at a cooling speed of not less than 100° C./sec.

5. The fabrication method of hydrogen-absorbing alloy as claimed in claim 3, wherein the hydrogen-absorbing alloy after heat-treatment is rapid-cooled by soaking in a coolant.

6. The fabrication method of hydrogen-absorbing alloy as claimed in claim 4, wherein the hydrogen-absorbing alloy after heat-treatment is rapid-cooled by soaking in a coolant.

7. The fabrication method of hydrogen-absorbing alloy as claimed in claim 3, wherein the hydrogen-absorbing alloy after heat-treatment is rapid-cooled under an atmosphere of which major component is He.

8. The fabrication method of hydrogen-absorbing alloy as claimed in claim 4, wherein the hydrogen-absorbing alloy after heat-treatment is rapid-cooled under an atmosphere of which major component is He.

9. A fabrication method of hydrogen-absorbing alloy represented by a general formula $Ln_{1-x}Mg_xNi_yA_z$ wherein Ln is at least one element selected from rare-earth elements including Y, Ca, Zr, and Ti, A is at least one element selected from Co, Fe, Mn, V, Cr, Nb, Al, Ga, Zn, Sn, Cu, Si, P and B, and $0.15 \leq x \leq 0.30$, $0 < z \leq 1.5$, and $2.8 \leq y+z \leq 4.0$ are satisfied, comprising steps of:
heat-treating the hydrogen-absorbing alloy at a temperature 10° C. to 60° C. lower than a melting point of hydrogen-absorbing alloy for one hour or more;
cooling the hydrogen-absorbing alloy after the heat-treatment;
heat-treating the hydrogen-absorbing alloy after the cooling at a temperature 10° C. to 110° C. lower than a melting point of hydrogen-absorbing alloy for one hour or more; and
rapid-cooling the hydrogen-absorbing alloy after the heat-treatment at a cooling speed of not less than 0.5° C./sec from a heat-treatment temperature.

10. The fabrication method of hydrogen-absorbing alloy as claimed in claim 9, wherein the hydrogen-absorbing alloy after heat-treatment is rapid-cooled from the heat-treatment temperature at a cooling speed of not less than 100° C./sec.

11. The fabrication method of hydrogen-absorbing alloy as claimed in claim 9, wherein the hydrogen-absorbing alloy after heat-treatment is rapid-cooled by soaking in a coolant.

12. The fabrication method of hydrogen-absorbing alloy as claimed in claim 10, wherein the hydrogen-absorbing alloy after heat-treatment is rapid-cooled by soaking in a coolant.

13. The fabrication method of hydrogen-absorbing alloy as claimed in claim 9, wherein the hydrogen-absorbing alloy after heat-treatment is rapid-cooled under an atmosphere of which major component is He.

14. The fabrication method of hydrogen-absorbing alloy as claimed in claim 10, wherein the hydrogen-absorbing alloy after heat-treatment is rapid-cooled under an atmosphere of which major component is He.

15. An alkaline storage battery comprising a positive electrode, a negative electrode using a hydrogen-absorbing alloy, and an alkaline electrolyte, wherein the negative electrode uses the hydrogen-absorbing alloy according to claim 1.

16. An alkaline storage battery comprising a positive electrode, a negative electrode using a hydrogen-absorbing alloy, and an alkaline electrolyte, wherein the negative electrode uses the hydrogen-absorbing alloy according to claim 2.

* * * * *